United States Patent [19]
Converse

[11] Patent Number: 5,085,467
[45] Date of Patent: Feb. 4, 1992

[54] ENERGY ABSORBING SUPPORT MEMBER FOR A STEERING COLUMN

[75] Inventor: Dale W. Converse, Livonia, Mich.

[73] Assignee: Ford Motor Company, Dearborn, Mich.

[21] Appl. No.: 629,801

[22] Filed: Dec. 19, 1990

[51] Int. Cl.$^5$ .............................................. B62D 1/19
[52] U.S. Cl. ...................................... 280/777; 74/492
[58] Field of Search .................... 280/777, 779, 780; 74/492

[56] References Cited

U.S. PATENT DOCUMENTS

| | | | |
|---|---|---|---|
| 1,498,567 | 6/1924 | Onderdonk | 280/779 |
| 3,424,263 | 1/1969 | Black | 180/82 |
| 3,505,897 | 4/1970 | Scheffler et al. | 74/492 |
| 3,600,971 | 8/1971 | Scarvelis et al. | 74/492 |
| 3,703,106 | 11/1972 | Arntson et al. | 74/492 |
| 3,803,938 | 4/1974 | Bratke et al. | 74/492 |
| 3,855,876 | 12/1974 | Albrecht et al. | 74/492 |
| 4,102,217 | 7/1978 | Yamamoto et al. | 74/492 |
| 4,117,741 | 10/1978 | Yazane et al. | 74/492 |
| 4,194,411 | 3/1980 | Manabe et al. | 74/492 |
| 4,432,565 | 2/1984 | Suzuki et al. | 280/779 |
| 4,452,096 | 6/1984 | Workman | 280/779 |
| 4,517,854 | 5/1985 | Kawabata et al. | 74/492 |
| 4,531,760 | 7/1985 | Patzelt | 280/777 |
| 4,616,522 | 10/1986 | White et al. | 74/492 |
| 4,627,306 | 12/1986 | Berenjian | 74/492 |
| 4,630,716 | 12/1986 | Faust | 188/371 |
| 4,703,669 | 11/1987 | Hyodo | 74/492 |
| 4,738,469 | 4/1988 | Ushijima et al. | 280/777 |
| 4,773,674 | 9/1988 | Wierschem | 280/777 |
| 4,786,076 | 11/1988 | Wierschem | 280/777 |

FOREIGN PATENT DOCUMENTS

| | | | |
|---|---|---|---|
| 62-110566 | 5/1987 | Japan | 74/492 |
| 63-149258 | 6/1988 | Japan | 74/492 |
| 950573 | 8/1982 | U.S.S.R. | 74/492 |
| 2187144A | 9/1987 | United Kingdom | 74/492 |

Primary Examiner—Charles A. Marmor
Assistant Examiner—Tamara L. Finlay
Attorney, Agent, or Firm—Raymond L. Coppiellie; Clifford L. Sadler

[57] ABSTRACT

An energy absorbing steering column support member for mounting a steering column to a half beam support frame extending transversely of the vehicle. The support member being in the general shape of a parallelogram having a first base wall affixed to the steering column and disposed along the axis of the steering column, a second base wall opposite the first base wall and affixed to the half-beam, and two opposed channel-shaped side walls extending between the first and second base walls. Each side wall including upper and lower rolled flanges which increase in width and accordingly, in bending resistance, from the first base wall to the second base wall. As the steering column axially collapses during a high energy impact, each side wall absorbs energy by forming a plastic hinge that moves from the first base wall to the second base wall at a rate providing near constant energy absorption at the initial peak load level.

11 Claims, 3 Drawing Sheets

ENERGY ABSORBING SUPPORT MEMBER FOR A STEERING COLUMN

TECHNICAL FIELD

The present invention relates to an energy absorbing support member for mounting a collapsible steering column to a vehicle.

BACKGROUND ART

Axially collapsible steering columns with energy absorbing support members are used throughout the automobile industry to reduce high energy impact forces of a steering wheel. Most commonly, these support members are transversely disposed of the steering column, and surround the steering column at their center, and include plastically deformable flanges extending transversely of the steering column and anchored at the outboard end of the flange to the dash or instrument panel supporting frame work of the vehicle. Examples of these support members are disclosed in U.S. Pat. Nos. 4,194,411 and 4,627,306.

The support of the steering column may be limited to one such support member, or may include the same type of support member at both the forward and rear positions on the steering column as shown in U.S. Pat. No. 3,505,897.

Such support members have several common characteristics. First, only discrete portions in the energy absorbing sections of these support members contribute to energy absorption, which makes it difficult to provide uniform energy absorption over the full design displacement of the steering column.

Second, these support members tend to be oversized since major portions of the part are not utilized for energy absorption.

Third, these support members generally require attachment to the vehicle on both sides of the steering column or from the top thereof, which unnecessarily complicates the vehicle interior design and makes more difficult the production installation of the steering column assembly.

Finally, these support members provide little design selectivity in determining mode or path of collapse of the steering column.

SUMMARY OF THE INVENTION

An object of the present invention is to provide a support member for mounting a steering column having a portion which forms an energy absorbing plastic hinge that continuously translates along that portion in response to the axial collapse of the steering column thereby utilizing the entire support member for energy absorption.

Another object of the invention is to provide a support member which provides a uniform axial resistance throughout the collapse of a steering column.

Yet another object is to provide a support member capable of controlling the mode of collapse of the steering column by varying design parameters and the orientation of the mounting of the support member to the steering column.

A further object of the invention is to provide a support member that may be mounted to a half beam support frame fixedly secured to the driver's side of the vehicle, thus providing clearance above and laterally inwardly of the steering column, and accommodating greater design freedom.

Still a further object of the invention is to provide a parallelogram-shaped support member with side walls having rolled flanges or integral ribbed members, which progressively increase in cross-section area to thereby vary the bending stiffness of the side walls along their length as a means of assuring uniform energy absorption during the axial displacement of the steering column.

It is yet another object of the invention to provide a simplified support member having few components, and being inexpensive to manufacture and install.

The present invention includes a support member for mounting a collapsible steering column to a vehicle wherein the support member forms an energy absorbing plastic hinge therewithin which continuously translates from the steering column toward the vehicle mounting structure as the steering column collapses.

In the preferred embodiment, the support member is parallelogram-shaped and comprises a first base wall fixedly attached to and disposed along the axis of the steering column, a second base wall fixedly secured to a half-beam which is fixedly secured to the side of a vehicle, and a pair of opposing side walls extending between and fixedly securing to the base walls. The side walls have first ends adjacent the first base wall and extend forwardly and laterally outwardly to second ends adjacent the second base wall. The side walls are of uniform thickness, channel-shaped in cross-section and include rolled edges or flanges that extend forwardly and increase in width from the first end to the second end.

When an axial load exceeding a predetermined magnitude is placed upon the steering column, the support member will bendably deform allowing the steering column to collapse. An axial load applied forwardly along the steering column will be imparted upon the first base wall, resulting in a bending moment being placed upon the side walls of the support member. With sufficient bending moment placed on the side walls, plastic hinges will form along a generally vertical axis in the planes of the side wall beginning at the first end nearest the steering column. With continued application of forces to the steering column, and accordingly, resulting bending moment applied to the side walls, the plastic hinges will translate from the first ends of the side walls to the second ends, absorbing energy throughout the translation. The portions of the side walls laterally inward of the plastic hinges, relative to the center of the vehicle, will move forward of their corresponding plastic hinges providing translation of the first base wall and the collapse of the steering column.

The present invention, in its preferred embodiment, is aligned with the side walls perpendicular to the steering column axis, thereby causing the steering column to collapse coaxially along its precollapse axis. Also in the preferred embodiment, the flanges on the side walls are sized to produce an axial resistance to the steering column displacement which will remain nearly uniform throughout the collapse at the initial impact load causing first displacement, thereby maximizing energy absorption for a given displacement of collapse while minimizing the peak impact force exerted upon the driver of a vehicle.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
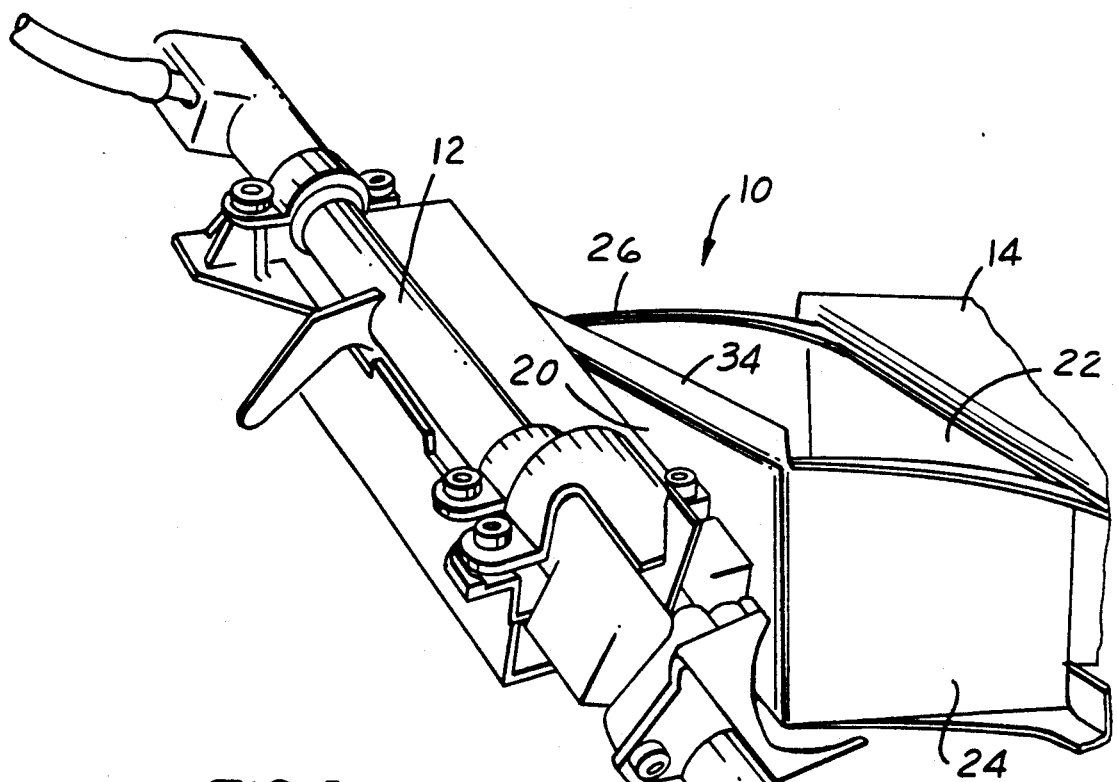
FIG. 1 shows a perspective view of the present invention from a forward, medial position with the support member mounted to and between a vehicle half-beam and a steering column.
Figure 2:
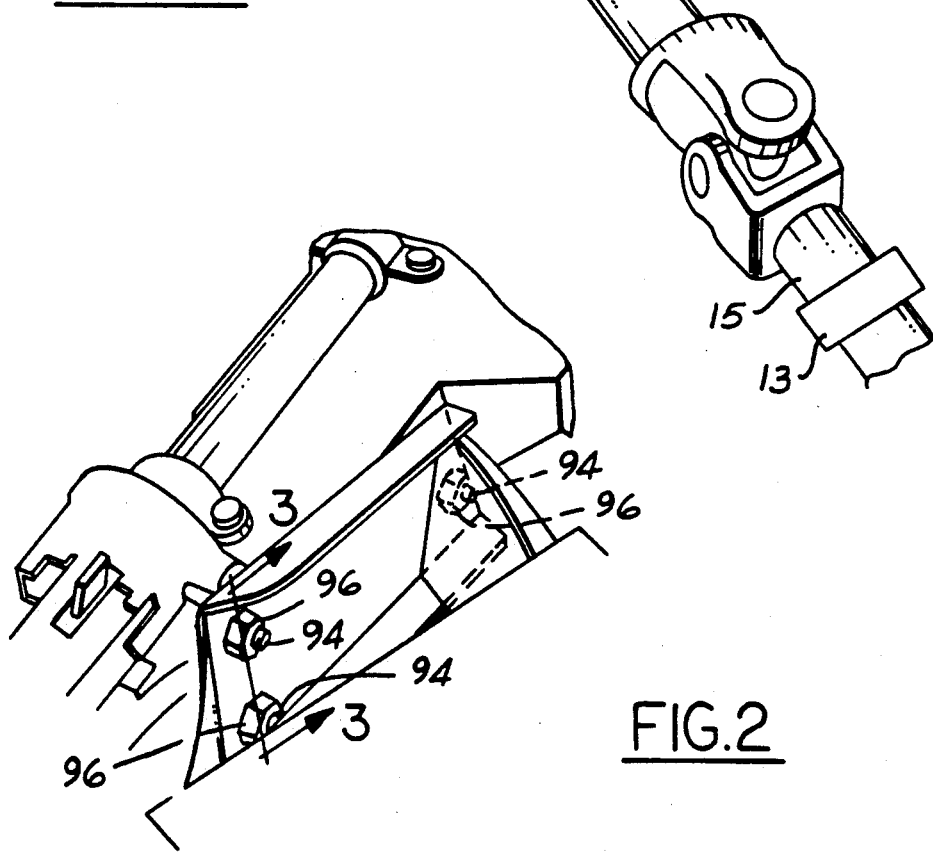
FIG. 2 shows a perspective view from a forward lateral position of the steering column support member of the present invention showing the manner in which the support member is secured to the steering column.
Figure 3:
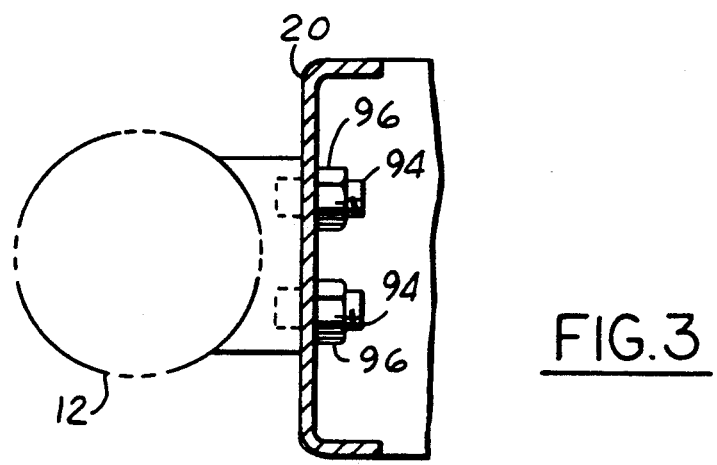
FIG. 3 shows a partial cutaway view taken along section 3—3 of FIG. 2.

As shown generally in FIGS. 1 and 2, the present invention is an energy absorbing support member 10 which is disposed between and fixedly secured to a steering column 12 and a half-beam support frame member 14, hereafter referred to simply as a "half-beam". The half-beam 14 is fixedly secured to the side of a vehicle. The support member 10 is in the general shape of a parallelogram and is comprised of a first base wall 20 affixed to steering column 12 and disposed along the axis of the steering column 12, a second base wall 22 opposite the first base wall 20 and affixed to half-beam 14, and opposed side walls 24,26. The side walls 24 and 26 extend forwardly and laterally outwardly from the first base wall 20 to the second base wall 22.

A one-way slip off coupling 13 of conventional design is provided at an intermediate point in the steering shaft 15 at the forward lower end of the steering column. A suitable coupling 13 is shown in U.S. Pat. No. 3,477,307, the details of which are incorporated herein by reference.

Figure 4:
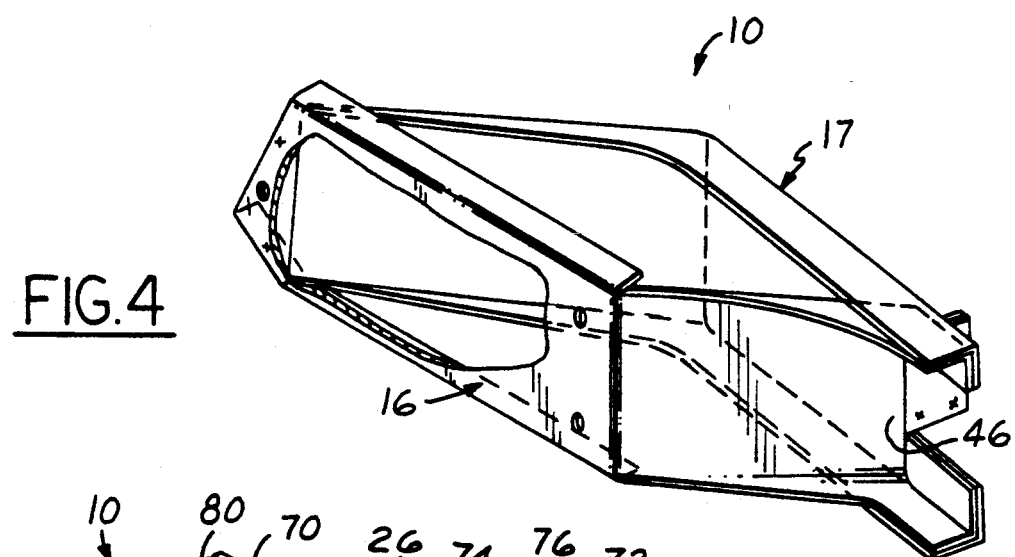
FIG. 4 shows a perspective view of the fully assembled support member of the present invention.
Figure 5:
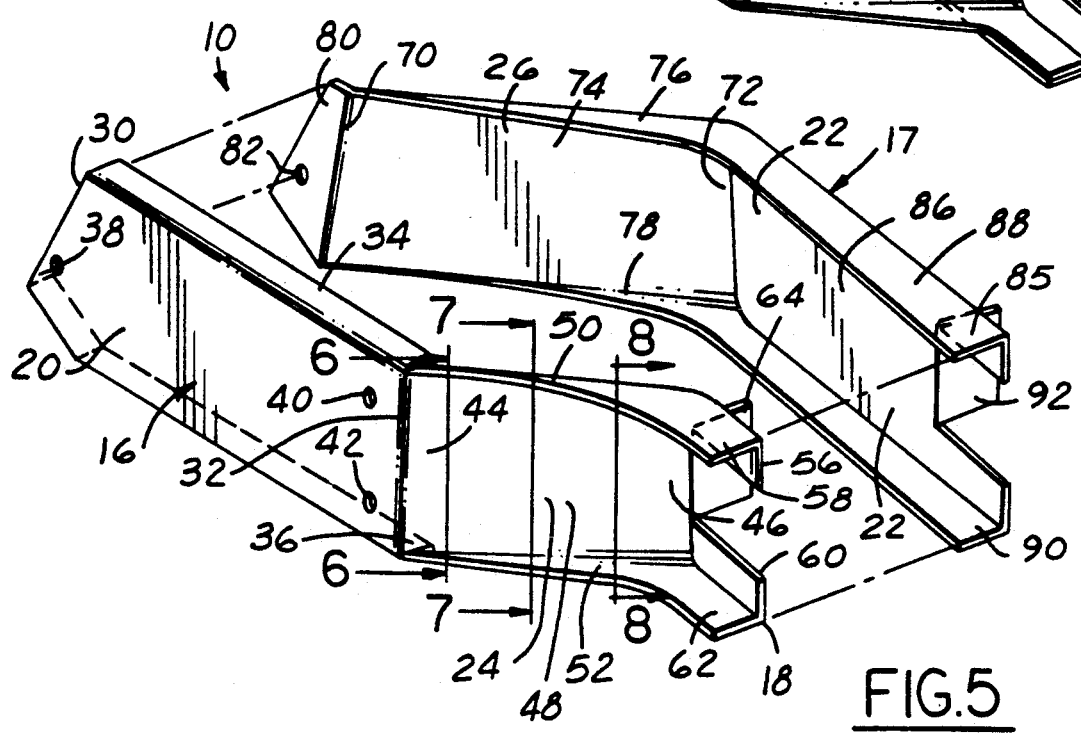
FIG. 5 shows an exploded view of the steering column support member shown in FIG. 4.

The details of the support member 10 are best seen in FIG. 4 wherein it is shown in its composite state and in FIG. 5 showing an exploded view of the two generally identical steering column half assemblies 16,17 which are to be welded together.

The half assembly 16 includes the first base wall 20, first side wall 24 and end section 18.

First base wall 20 has a rearward end 30 and a forward end 32 and includes an upper flange 34 and a lower flange 36. Flanges 34 and 36 are formed from the base wall and extend generally perpendicularly and laterally outward therefrom. Base wall 20 has an aperture 38 proximate rearward end 30 and upper and lower apertures 40,42, respectively, proximate forward end 32 through which threaded studs 94 extend from the steering column to secure support member 16.

First side wall 24 has a first end 44 adjacent base wall 20 and a second end 46 located at its laterally outward and forward end, and is comprised of side plate 48 from which upper and lower flanges 50,52 are formed. Flanges 50 and 52 extend forward and uniformly increase in width from the first end 44 to second end 46 as described below in reference to FIGS. 6-8.

End section 18 includes an upper plate 56 having a formed upper flange 58, a lower plate 60 having a formed lower flange 62, and a tongue 64 which extends perpendicularly outward from plates 56,60. Flanges 58 and 62 are turned out from plates 56 and 60, respectively, generally perpendicularly and laterally inwardly therefrom.

Side plate 48 is disposed to first base wall 20 at an included angle which will vary depending on (i) the total steering column displacement desired and (ii) the degree of lateral movement of the steering column which can be accommodated without bringing the steering column into interference with other vehicle structure. Generally, this angle will vary from 45° to 90° with the former being most preferred for reasons given below in regard to FIGS. 9 and 10. End section 18 is disposed at the same general included angle from side plate 48.

The remaining steering column half assembly 17 is similarly constructed. It includes second side wall 26 having a first end 70 adjacent the first base wall 20 and a second end 72 adjacent the second base wall 22. Side wall 26 also includes a side plate 74 having an upper flange 76 and a lower flange 78 constructed in the same manner as flange 50,52 of the first side wall 24. For assembly purposes, second side wall 26 also includes a rearward plate 80 having an aperture 82 located therewithin.

Second base wall 22 has a first end 84 adjacent the second side wall 26 and a second end 85 located forward of the first end 84, and is comprised of base plate 86, and upper and lower flanges 88, 90, respectively which are formed from base plate 86. Flanges 88 and 90 extend generally perpendicularly and laterally inwardly from base plate 86. Second base wall 22 is further comprised of a tongue 92 formed from and extending laterally outwardly from base plate 86.

Rearward plate 80 is formed at an obtuse angle of approximately 135° from side plate 74. Similarly, base plate 86 is disposed at the same obtuse angle from side plate 74.

It is preferred that each half assembly 16,17 be formed from a single blank of heavy gauge sheet metal, i.e., 0.09 inches thick steel alloy in the preferred embodiment illustrated.

Thereafter, the half assemblies are nested within one another and spot welded at rearward plate 80 and across the tongues 64, 92.

The support member 10 is then securely fixed to half beam 14, as by welding as earlier described. Tongue 64,92 provides a useful means of locating support member 10 on the half beam and is welded to the half beam to assure the rigidity of the side wall at this juncture.

Support member 10 is secured to the steering column 12 via threaded studs 94 as best seen in FIG. 2. Studs 94 are secured to steering column 12 and extend through apertures 40, 42 and 38/82, respectively, of the first base wall 20 which is then secured by nuts 96.

Figure 6:
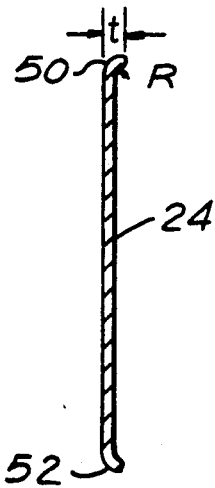
FIGS. 6-8 are taken along sections 6—6, 7—7 and 8—8 of FIG. 5, respectively, showing the increasing width of the flanges at increasing lateral distances from the first base wall and the rolled construction of each such flange.
Figure 7:
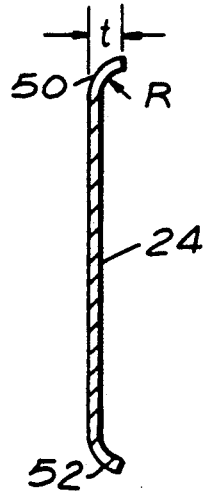
Figure 8:
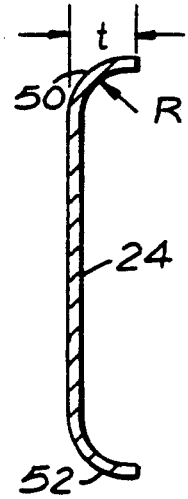

FIGS. 6, 7 and 8 show the cross-section of side wall 24 at various points along its length beginning with the juncture at the base wall 20 nearest the steering column (FIG. 6), to an intermediate point (FIG. 7) and the juncture at the base wall 22 (FIG. 8). Each flange 50,52 is constructed identically. The width (t) of flange increases at a constant taper from one end to the other. The radius R to which the flanges 50,52 are rolled is maintained constant and is fairly generous to assure the side wall will fail in accord with the intended mode described below. In the preferred embodiment illustrated, the degree of taper is approximately 10° and the radius is selected to be equal to the width of the flange at its widest end as seen in FIG. 8, i.e., ⅜ inch.

In operation, should the occupant directly or indirectly impact the steering wheel during a collision, the axial impact load will be transferred along the steering column 12 through first base wall 20 to first side wall 24 and second side wall 26, and finally to the second base wall 22 and the half beam 14. The axial load from the steering column 12 will also induce bending moments upon first and second side walls 24 and 26.

If the impact exceeds a predetermined design limit, the side walls 24 and 26 will plastically deform at the point of least bending resistance, namely, at their first ends 44 and 70. As this occurs, plastic hinges 110 and 112 will be formed across the vertical extent of each side wall 24,26.

Figure 9:
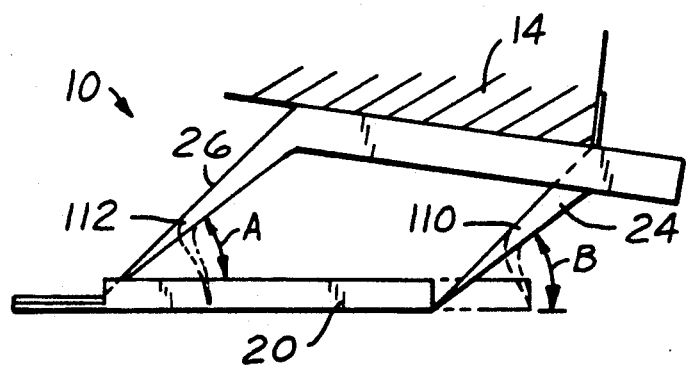
FIG. 9 is a sketch showing in plan view the support member of the present invention in an undeformed state, and in phantom lines a partially collapsed state with plastic hinges formed in the side walls.
Figure 10:
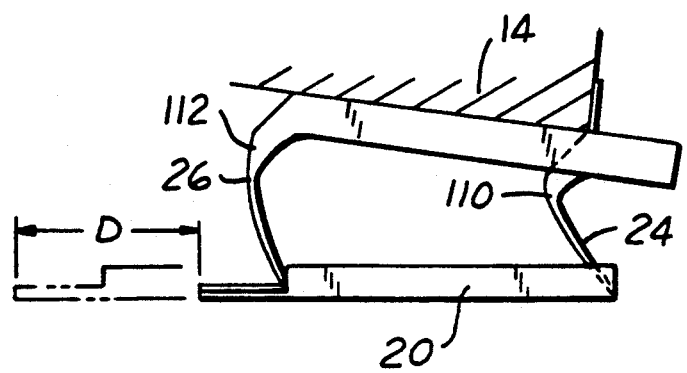
FIG. 10 is a sketch showing in plan view the support member of the present invention wherein the side walls are totally collapsed and the plastic hinges have translated to a position adjacent the second base wall.

If the force applied to the steering column remains above the threshold value, plastic hinges 110 and 112 will translate along first and second side walls 24 and 26 from their first ends 44 and 70, respectively, towards their second ends 46 and 72. FIG. 9 shows plastic hinges 110 and 112 in first and second side walls 24 and 26 in an intermediate collapse position in phantom line. FIG. 10 illustrates the plastic hinges 110 and 112 after they have translated to the second ends 46 and 72 of first and second side walls 24 and 26 and allowed the steering column 12 to collapse to the fullest designed displacement D.

With the first displacement of the steering column 12, the steering shaft 15 will disconnect at coupling to permit unrestricted displacement.

The support member 10 may be designed to control the mode or direction of the collapse of steering column 12. For example, in the preferred embodiment, the collapse of the steering column 12 is directed along its uncollapsed axis. Originally, support member 10 is generally parallelogram-shaped with the side walls 20 and 22 extending laterally outwardly and forwardly from their first ends 44 and 70, respectively, to their second ends 46 and 72. As the plastic hinges 110 and 112 translate laterally outwardly, as seen in FIGS. 9 and 10, the portions of side walls 24 and 26 laterally inward of the plastic hinges 110 and 112, rotate about the plastic hinges 110 and 112 and move forwardly of the corresponding plastic hinge. As the plastic hinges traverse each rolled flange, the flange will be caused to roll back generally to its initial shape as a part of the metal blank from which it was formed, thereby absorbing impact energy additional to that absorbed by the plastic hinge at its vertical axis. The combination of the laterally outward translation of plastic hinges 110 and 112 and the rotation and forward translation of the laterally inward portions of the side walls 24, 26, results in the first base wall 20, and accordingly the steering column 12, linearly translating forwardly along its initial precollapse axis until the impact energy is completely expended.

The inclination of acute angles A and B, formed between the first and second side walls 24 and 26 and the first base wall 20, respectively, and seen in FIG. 9, is selected to produce this linear translation of the steering column 12 during collapse to avoid interferences with surrounding portions of the instrument panel or reinforcing structure. Generally, the angles A and B will be selected within a range of 45°–90°. In a typical application, the angles A and B are approximately 45 degrees.

If it is desired that steering column 12 translate only laterally inwardly during ridedown, angles A and B would be 90° or greater. Decreasing angles A and B will result in the steering column 12 translating laterally in both directions thereby allowing the clearance between the steering column 12 and surrounding vehicle structure to be balanced equally on both sides of the steering column.

The height at which the steering column 12 is maintained during collapse may also be controlled during collapse For example, looking at FIG. 2, support member 10 is aligned on half-beam 14 such that flange 34 is parallel with the horizon and will allow plastic hinges 110,112 to develop down the side walls at a constant height relative to the vehicle. This maintains the steering wheel at a constant height.

On the other hand, mounting support member 10 with flange 34 parallel to the steering column axis would enable the steering column as it is displaced to ride down this axis, thereby progressively lowering the steering wheel as the support member collapses Other combinations are also possible. The support member need not be arranged as a perfect parallelogram. One side wall may be slightly longer than the other and each may be disposed to the base wall at an angle, A or B, which varies slightly from the other. For example, in the preferred embodiment, angle A will be slightly greater than angle B, e.g., by 5°, side wall 26 will be slightly longer than side wall 24 and the base walls 20,22 will converge slightly toward one another in the forward direction, as seen most prominently in FIGS. 2, 9 and 10. While this embodiment maintains the general shape of a parallelogram, the forward and lateral displacement of the steering column will be a departure from that which would be expected of a true geometric parallelogram linkage. Thus, when referring to the support member as being a parallelogram, it will be understood this is a general designation and not a precise geometric shape.

Ideally, the axial resistance to collapse of the steering column 12 will remain nearly uniform throughout the collapse. The axial resistance provided by the support member 10 against the collapse of steering column 12 at any one point of displacement D will be equal to the combined bending resistance of corresponding sections at the plastic hinges 110 and 112.

In the preferred embodiment described, the present invention includes two longitudinally disposed side walls connected to two base walls, forming a parallelogram. This invention also contemplates a simplified version having a single side wall fixedly secured at one end to the half-beam or any other suitably located support structure and at the other end to the steering column.

While the best mode for carrying out the invention has been described in detail, those familiar with the art to which this invention relates will recognize various alternative designs and embodiments, including those mentioned above, for practicing the invention as defined by the following claims.

I claim:

1. An energy-absorbing support member for supporting a vehicle steering column in fixed position relative to a vehicle frame member, wherein the steering column is axially collapsible in response to a force exceeding a pre-determined magnitude applied along the axis of the steering column, comprising:

a side wall member having a first end adapted to be secured to the steering column, a second end adapted to be secured to the vehicle frame member, an upper edge portion and a lower edge portion;

at least one of said upper and lower edge portion being tapered and thereby increasing in width from one side end to the other said end;

said side wall member being bendable about a plastic hinge axis movable along said at least one tapered edge portion in response to the axial collapse of said steering column, whereby said side wall member will be caused to bend about said plastic hinge axis to progressively absorb impact energy of increasing amount and at a controlled rate;

said side wall member including (i) a main body portion adapted to lie in a plane disposed generally normally to the steering column axis and (ii) a flange at said at least one tapered edge portion extending generally normally of said main body portion along a fold generated about a radius, and said flange increasing in width from a portion of substantially no width at said first end to a point of maximum width at said second end to provide the taper to said at least one tapered edge portion, and whereby upon axial collapse of said steering column said at least one tapered edge portion will be caused to roll back toward a position disposed generally within the plane of said main body portion.

2. An energy-absorbing support member for supporting a vehicle steering column in fixed position relative to a vehicle frame member, wherein the steering column is axially collapsible in response to a force exceeding a pre-determined magnitude applied along the axis of the steering column, comprising:

a side wall member having first end adapted to be secured to the steering column, a second end adapted to be secured to the vehicle frame member, an upper edge portion and a lower edge portion;

each said upper and lower edge portion being tapered and thereby increasing in width from one said end to the other said end;

said side wall member being bendable about a plastic hinge axis movable along said at least one tapered edge portion in response to the axial collapse of said steering column, whereby said side wall member will be caused to bend about said plastic hinge axis to progressively absorb impact energy of increasing amount and at a controlled rate;

said side wall member including (i) a main body portion adapted to lie generally in a plane disposed generally normally to the steering column axis and (ii) a flange at each of said upper and lower edge portions extending generally normally of said main body portion along a fold generated about a radius, each said flange increasing in width from a point of minimum width at said first end to a point of maximum width at said second end to provide the taper to said edge portions, and whereby upon axial collapse of said steering column said upper and lower edge portions will be caused to roll back toward a position disposed generally within the plane of said main body portion.

3. The energy absorbing support member of claim 2 wherein said support member includes a first base wall adapted to be secured to the steering column, a second base wall adapted to be secured to the vehicle frame member and a pair of said side wall members, each side wall member connecting each of said first and second base walls at the respective ends of each, and said support member being in the general form of a parallelogram.

4. The energy absorbing support member of claim 3 wherein each of said side wall members is disposed to said base wall at an included angle of about 90° to 135°.

5. The energy absorbing support member of claim 3 wherein the flanges of each said side wall member are disposed laterally outwardly from the respective side wall member in the direction in which the steering column will collapse.

6. The energy absorbing support member of claim 5 wherein each of said side wall members is disposed to said base wall at an included angle of about 90° to 135°.

7. The energy absorbing support member of claim 5 wherein said support member comprises two substantially identical half assemblies each comprising one said base wall and one said side wall member, and each said half assembly being formed from a single sheet metal blank.

8. In combination, a vehicle steering column, a half-beam support structure extending laterally of the steering column and adapted to be secured to the vehicle, and an energy absorbing support member disposed between the steering column and half-beam support structure and secured to each;

said support member supporting the vehicle steering column in fixed position relative to the half-beam support structure, the steering column being axially collapsible in response to a force exceeding a pre-determined magnitude applied along the axis of the steering column, said support member including a side wall member having a first end adapted to be secured to the steering column, a second end adapted to be secured to the half-beam support structure, an upper edge portion and a lower edge portion;

each said upper and lower edge portion being tapered and thereby increasing in width from one said end to the other said end;

said side wall member being bendable about a vertically disposed plastic hinge axis movable along said upper and lower edge portions in response to the axial collapse of said steering column, whereby said side wall member will be caused to bend about said vertically disposed plastic hinge axis to progressively absorb impact energy of increasing amount and at a controlled rate;

said support member including a first base wall secured to the steering column, a second base wall secured to the half-beam support structure and a pair of said side wall members, each side wall member connecting each of said first and second base walls at the respective ends of each, and said support member being in the general form of a parallelogram;

each said side wall member including (i) a main body portion adapted to lie generally in a plane disposed generally normally to the steering column axis and (ii) a rolled flange at each of said upper and lower edge portions extending normally of said main body portion along a fold generated about a radius equal to the maximum width of said flange, each said rolled flange increasing in width from a point of no width at said first end to a point of maximum width at said second end whereby upon axial collapse of said steering column said upper and lower edge portions will be caused to roll back to a position disposed generally within the plane of said main body portion.

9. The combination of claim 8 wherein the rolled flanges of each said side wall member are disposed laterally outwardly from the respective side wall member in the direction in which the steering column will collapse.

10. The combination of claim 9 wherein each of said side wall members is disposed to said base wall at an included angle of about 45° to 90°.

11. The energy absorbing support member of claim 8 wherein said support member comprises two substantially identical half assemblies each comprising one said base wall and one said side wall member, and each said half assembly being formed from a single sheet metal blank.

* * * * *